United States Patent Office 2,834,940
Patented May 13, 1958

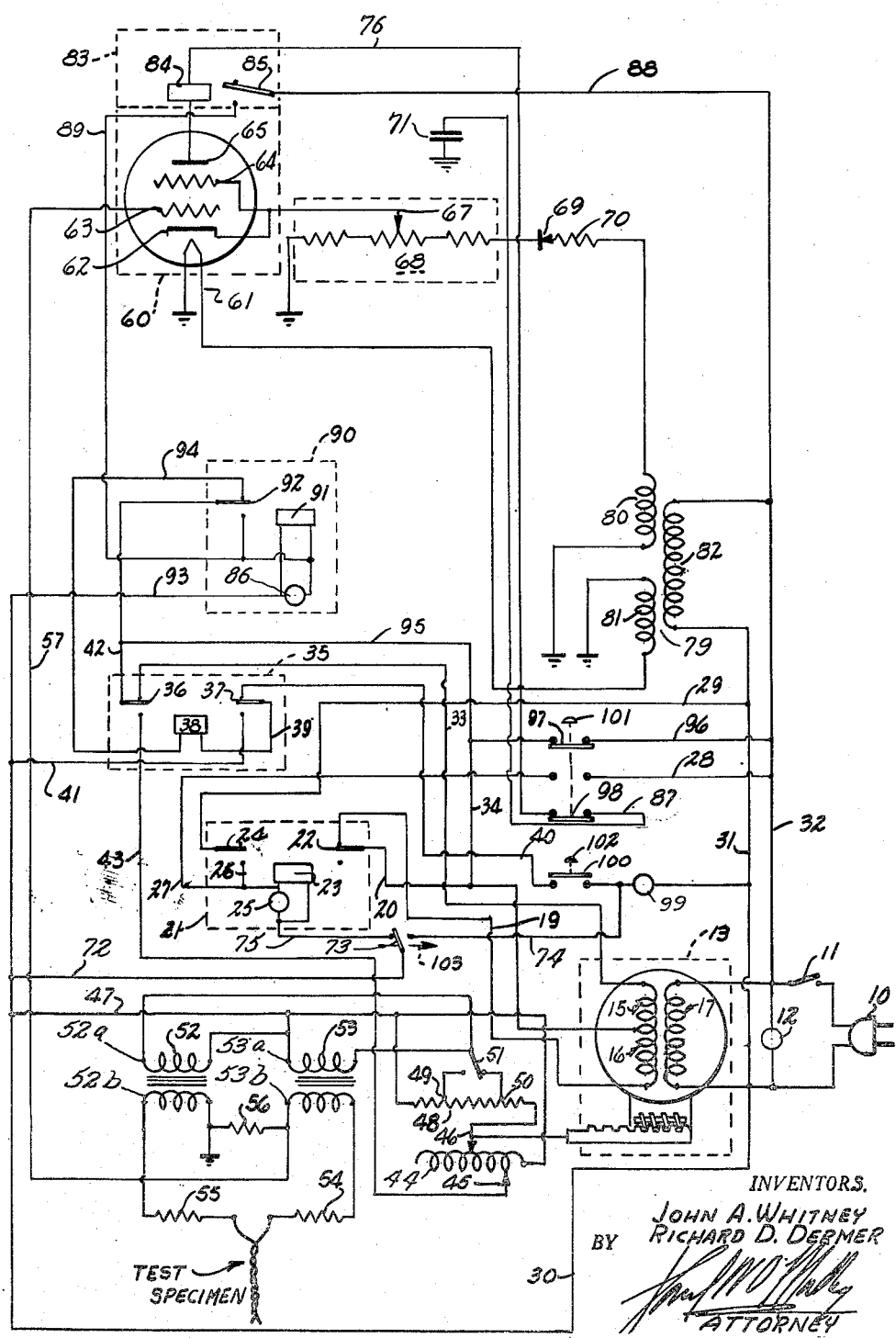

2,834,940

APPARATUS FOR TESTING WIRE COATINGS

Richard D. Dermer and John A. Whitney, Fort Wayne, Ind., assignors, by mesne assignments, to Essex Wire Corporation Application June 23, 1954, Serial No. 438,687

3 Claims. (Cl. 324—54)

This invention relates to a machine for testing the electrical properties of wire coatings and in particular to a machine for testing the dielectric strength of magnet wire insulation.

The enamel insulation or other insulating material on magnet wire must meet certain dielectric requirements. One method of testing for dielectric strength comprises twisting two sample wires together under controlled conditions. A voltage is then applied across the conductors and is increased until the dielectric is ruptured and electrical contact is made between the twisted conductors.

In order that correlative results be obtained from test sample to test sample and between laboratories, it is desirable to eliminate as many test variables as possible. One of the variables that occurs, for example, is with respect to the rate of voltage rise. Manual increase of applied voltage makes it virtually impossible to select a variety of rates of rise or to maintain a given rate. In addition, when dielectric rupture occurs, it is ordinarily necessary to read a meter which introduces the possibility of error. Finally the operator may initiate the test at other than zero voltage. Thus, a manually controlled test is subject to variation between operators and even from test to test. There is no assurance that test variations are not influenced by the operator.

The present invention provides a means for selectively applying a constant rate of voltage rise to a test specimen. Further it provides for an instantaneous locking of the voltage recorder so that true rupture voltage can be logged, and it insures that tests will be started from the same point, i. e., zero voltage. The invention, therefore provides an efficient means for testing standard twisted conductors and for providing correlative test results.

The electrical circuitry of the test machine is disclosed in the drawing.

The test specimen is placed in position, as indicated, to begin the test. In general, the operation of the test device is based upon the use of a constant speed shaded pole motor to drive a moveable contact on an autotransformer. The autotransformer is supplied with 60 cycle voltage and the increasing voltage tapped off by the moveable contact is supplied to a step-up transformer. The relatively high voltage of the transformer secondary is applied to the test specimen until rupture occurs. The current which passes between the twisted strands upon rupture of the insulation is used to fire a thyratron tube which in turn actuates means to arrest the moveable contact on the autotransformer and to register the voltage of rupture. The shaded pole motor is used to advantage in that the rotor can be stopped practically instantaneously by closing a previously opened shaded pole winding circuit.

The male plug 10 is used to put the test set across the line supply. When power switch 11 is closed, a circuit is completed through the field coil 17 of the motor 13. Indicator light 12 and the primary winding 82 of transformer 79 are also energized. To start the test, a pushbutton start switch 102 is momentarily depressed. A circuit is thereby completed through coil 38 of the relay 35 which reading from lead 30 consists of lead 72, contact 73, lead 74, contact 100 of switch 102, lead 40, contact 37, lead 39, coil 38, lead 94, contact 92, lead 95, contact 97 of switch 101, lead 96. Thus, relay coil 38 is across the power leads 30 and 32. When relay coil 38 is energized, the relay is pulled in, contact 37 bridges leads 39 and 41 to replace the circuit through the starting switch 102, limit switch 103, and contact 37 of lock in relay 35. When coil 38 of relay 35 is energized, contact 36 opens the connection of leads 33 and 34. By breaking this connection, the shaded pole circuit of the motor 13 comprising lead 33, winding 15, and lead 34 is opened. The opposing shaded pole circuit comprising winding 16, lead 19, contact 22, and lead 20 remains closed and the current induced in this circuit due to transformer action causes the motor to rotate. The motor is geared to drive the moveable tap 46 of the autotransformer 44 at a constant speed. When the moveable tap 46 of autotransformer 44 is moved from its starting position, contact 73 of the limit switch 103 is operated to open the circuit between leads 72 and 74 and to close the circuit between leads 72 and 75. Indicator light 99 connected between lead 31 and lead 74 is energized when the moveable tap 46 is in the starting position to indicate that the test machine is ready for a testing cycle.

The bridging of leads 42 and 43 by contact 36 of relay 35 also serves to put the autotransformer across the line. The moveable supply tap 45 is used to calibrate the autotransformer against line voltage fluctuation. A voltage divider 48 having two taps 49 and 50 provides alternate rates of voltage rise as selected by the switch 51.

The transformers 52 and 53 are step-up transformers so that relatively high potential differences are developed between the two strands of the test specimen. The primary windings 52a and 53a are connected in parallel between line 47 and switch 51. The high potential secondary windings 52b and 53b are connected in series by resistor 56 and supply the testing potential to the test specimen through current limiting resistors 54 and 55.

When the enamel coating of the test strands ruptures, a current flows in the resistance 56 biasing the control grid 63 of the thyratron 60 connected to resistance 56 by lead 57. When the grid 63 is momentarily more positive than a certain critical voltage with respect to the cathode 62, the tube fires. A rectified D. C. current provided in a conventional manner by the transformer winding 80, resistance 70, and rectifier 69, and filter capacitor 71 is supplied to the anode 65 of thyratron 60 through a series circuit comprising lead 87, contact 98 of switch 101, lead 76, and coil 84 of relay 83. The secondary winding 81 is used merely as a low voltage source to energize the filament 61 of the thyratron tube 60. The resistor string 68 has an adjustable tap 67 to vary the bias applied to the cathode 62 and the shield grid 64 of thyratron 60.

The firing of the thyratron tube 60 results in energization of coil 84 of relay 83 so that contact 85 bridges the leads 88 and 89. Coil 91 of fault relay 90 is thereby energized as leads 89 and 93 connect the fault relay across the power leads 30 and 32. Indicator light 86 is also energized to indicate that the insulation of the test specimen has ruptured. Relay coil 91 opens the connection between relay contact 92 and lead 94. Coil 38 of relay 35 is therefore de-energized. Contact 36 returns to its normal position of bridging leads 33 and 34 with the result that motor winding 15 is dead shorted. With both shaded poles dead shorted, the rotor brakes to an almost instantaneous stop. The moveable tap 46 on the autotransformer stops with the motor and its position on the autotransformer indicates the exact voltage applied to the test specimen at the moment of rupure of the dielectric.

To reset the test device, it is necessary to de-energize relay coil 91 which in turn permits the operation of relay 35. It is also necessary to reverse the motor 13 to run the moveable tap 46 of the autotransformer back to a starting position. Finally the thyratron 60 must be extinguished. These three conditions are set up by depressing the reset button switch 101. Contact 97 of the switch 101 opens the coil circuit of relay 90 satisfying the first of the aforementioned conditions. As a result, relay 35 is energizable when starter switch 102 is depressed. Contact 98 opens the plate side of the thyratron circuit and as a result the thydratron is extinguished. Depression of switch 101 causes contact 97 to bridge leads 27 and 28. Coil 23 of relay 21 is thereby placed across the power leads 30 and 32 and is energized. Indicator lamp 25 is also energized to indicate that the test machine is being reset for a new testing cycle. Contact 24 of the relay 21 bridges leads 29 and 26 thereby locking in relay 21. Contact 22 opens the shaded pole 16 winding circuit and the motor rotates in a counterclockwise direction to run the moveable tap 46 back to zero. A limit switch 103 is provided to open the coil circuit of reset relay 21 when the moveable tap 46 is in the starting position. On de-energization of relay 21, contact 22 is restored to its normal position, to dead short the winding 16.

Various modifications of the invention are possible within the scope of the above description. As for example, automatic reset switching means may be included as well as automatic starting switches.

Having described my invention, I claim:

1. A device for applying a potential difference across a dielectric for testing purposes consisting of: a source of power; a variable output voltage transformer; a moveable tap on said variable transformer for adjusting its output voltage; a reversible motor for driving said variable transformer tap; a high potential transformer, a starting control circuit to energize said variable transformer, and to cause said motor to drive said variable transformer tap from a predetermined minimum voltage point to provide a constantly increasing input voltage to said high potential transformer; means for applying the output voltage of said high potential transformer to said dielectric; a fault control circuit to deenergize said variable transformer and arrest further movement of said variable transformer tap upon failure of said dielectric; and a reset control circuit to deenergize said variable transformer if not already deenergized, and to cause said motor to drive said variable transformer tap in a direction to reduce the output voltage of said variable transformer until the variable transformer tap is returned to said minimum voltage point; said control circuits preventing said variable transformer from being energized after failure of the dielectric until said variable transformer tap has been returned to said minimum voltage point.

2. The device of claim 1 further characterized in that said fault control circuit includes: a resistor connected to said high potential transformer whereby a potential drop occurs across said resistor upon failure of said dielectric; a gaseous tube provided with a cathode, an anode, and a control grid; a tube control circuit including said grid and cathode connected to said resistor; a first relay having a winding connected in series with the anode-cathode circuit of the gaseous tube; a first relay switch operated when said first relay winding is energized; and other relay means controlled by said first relay switch to deenergize said variable transformer, and to cause said motor to be stopped upon failure of the dielectric.

3. In a testing device including a high-potential transformer having a primary winding and a secondary winding for applying a high potential to a dielectric, and a variable output voltage transformer having a moveable tap for energizing the primary of said high-potential transformer from an A. C. source of electric power; the combination comprising: a reversible constant speed motor to move the variable transformer tap; said motor having an energizing winding connected to said A. C. power source, and first and second operating windings; said motor having a first terminal connected to said first motor winding, a second terminal connected to said second motor winding, and a common terminal connected to both of said first and second motor windings; said motor driving said moveable tap in a direction to increase the output voltage of said variable transformer when only said first motor terminal is connected to said common motor terminal; said motor driving said moveable tap in a direction to decrease the output voltage of said variable transformer when only said second motor terminal is connected to said common motor terminal; and said motor being stopped when said first and second motor terminals are both connected to said common motor terminal; a starting relay having a winding, normally closed contacts connecting said second motor terminal to said common motor terminal, first normally open contacts connected in series with said starting relay winding, and second normally open contacts which when closed connect said variable transformer to said A. C. power source; a fault relay having a winding, normally open contacts connected in series with said fault relay winding, and normally closed contacts; a reset relay having a winding, normally closed contacts connecting said first motor terminal to said common motor terminal, and normally open contacts connected in series with said reset relay winding; a manually operated starting switch having normally open contacts; a manually operated reset switch having normally open contacts, and first and second normally closed contacts; a limit switch having normally closed contacts and normally open contacts that respectively are opened and closed whenever said moveable tap is moved beyond a predetermined point of minimum variable transformer output voltage; a sensing resistor connected in series with said high-potential transformer secondary winding whereby a potential drop occurs across said resistor upon failure of said dielectric; a gaseous tube provided with a cathode, an anode, and a control grid; a rectifier for supplying D. C. power to said gaseous tube from said A. C. power source; a sensing relay having normally open contacts, and having a winding connected in series with said reset switch first normally closed contacts and the anode of said gaseous tube; circuits connecting said sensing relay winding and said gaseous tube to said D. C. power source; a tube control circuit including said sensing resistor for applying a bias voltage to said control grid with respect to said cathode; said tube control circuit applying a bias voltage greater than cut-off to said control grid when there is no potential drop across said sensing resistor, and applying a bias voltage less than cut-off when the potential drop across said sensing resistor exceeds a predetermined value upon failure of the dielectric to cause said gaseous tube to conduct and thereby energize said sensing relay winding; a starting control circuit connected to said A. C. power source through said reset switch second normally closed contacts, and including in a series relation said fault relay normally closed contacts, said starting relay winding, said starting switch normally open contacts, and said limit switch normally closed contacts; said starting relay first normally open contacts being in parallel with said starting switch normally open contacts and said limit switch normally closed contacts whereby upon the momentary closing of said starting switch contacts said starting relay winding is energized and maintained energized through said starting relay normally open contacts to energize said variable transformer and to cause said motor to drive said moveable tap to provide a constantly increasing voltage to said high-potential transformer; a fault control circuit connected to said A. C. power source through said reset switch second normally closed contacts, and including in a series relation said fault relay winding and said fault relay normally open contacts; said sensing relay normally open contacts being connected in parallel with said fault relay normally open contacts whereby upon failure of the dielectric said fault relay winding is energized and maintained energized through said fault relay normally open contacts to deenergize the starting relay winding which in turn deenergizes said variable transformer and arrests further movement of said moveable tap; and a reset control circuit connected to said A. C. power source and including in a series relation said reset switch normally open contacts, said reset relay winding, and said limit switch normally open contacts; said reset relay normally open contacts being connected in parallel with said reset switch normally open contacts whereby upon the momentary operation of said reset switch said reset relay is energized and maintained energized through said reset relay normally open contacts to deenergize said starting relay and said fault relay windings if not already deenergized and, until said reset relay is deenergized by opening of said limit switch upon return of the moveable tap to said point of minimum voltage, to cause said motor to drive said moveable tap in a direction to reduce the output voltage of said variable transformer, and to prevent said variable transformer from being reenergized.

References Cited in the file of this patent

UNITED STATES PATENTS

| | | |
|---|---|---|
| 2,088,317 | Bachelet | July 27, 1937 |
| 2,310,335 | Wolfson | Feb. 9, 1943 |
| 2,724,087 | Hand | Nov. 15, 1955 |